Oct. 31, 1939. D. R. HAGER 2,178,170
CLEVIS
Filed April 16, 1938
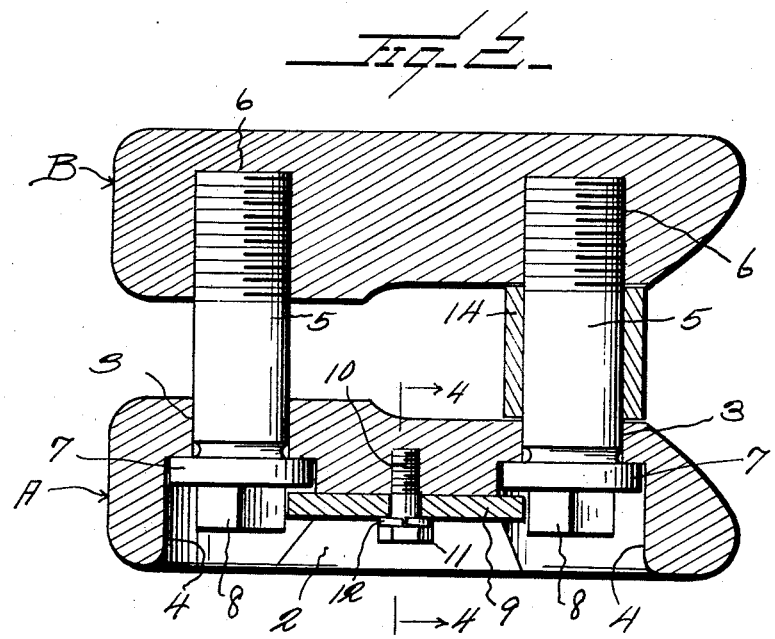
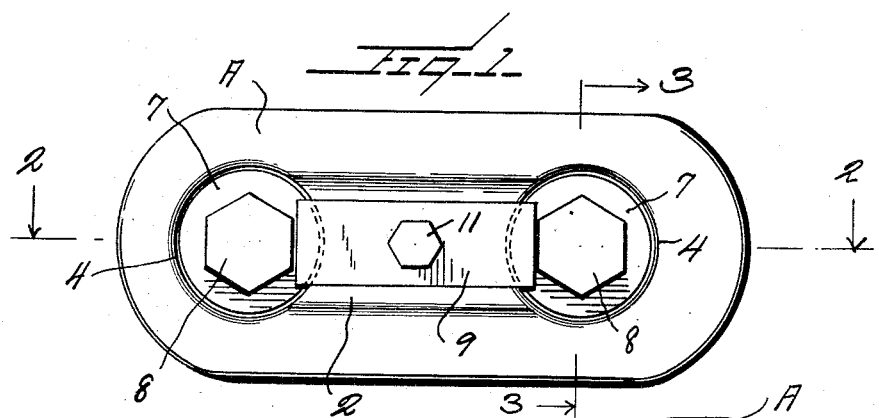
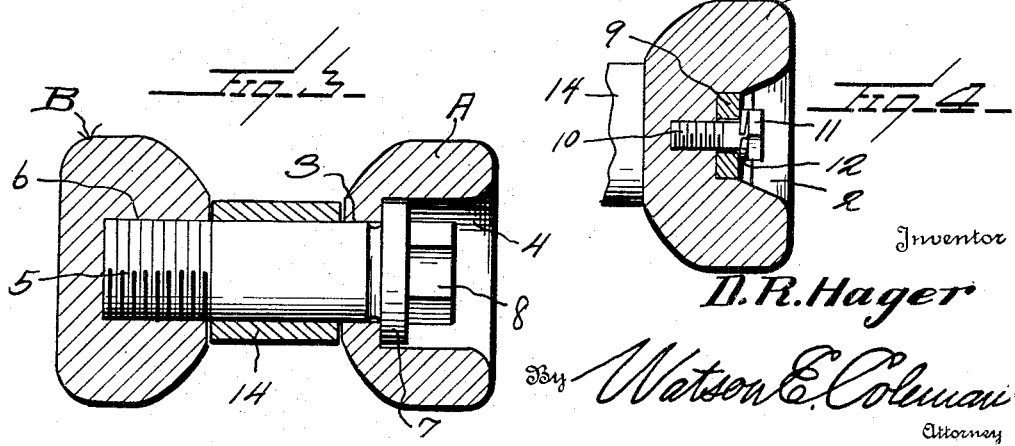
Inventor
D. R. Hager
By Watson E. Coleman
Attorney Patented Oct. 31, 1939

2,178,170

UNITED STATES PATENT OFFICE 2,178,170

CLEVIS

David R. Hager, Portola, Calif.

Application April 16, 1938, Serial No. 202,572

3 Claims. (Cl. 254—135)

This invention relates to a clevis and has relation more particularly to a device of this kind especially adapted for use over fairleads under great stress and for use through various blocks such as bull blocks, highlead blocks, etc., used in the logging industry and particularly in connection with tractor logging.

The invention particularly has for an object to provide a clevis constructed in a manner whereby is substantially eliminated inside wear on a cable eye and also serves to materially reduce outside wear.

The invention also has for an object to provide a clevis wherein the pin heads are protected from being battered and wherein the pins are of a type to be easily applied or removed.

Another object of the invention is to provide a clevis having means whereby the clevis pins are securely locked in position thus avoiding stripping of the threads of the pins.

The invention consists in the details of construction and in the combination and arrangement of the several parts of my improved clevis whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein—

Figure 1 is a view in side elevation of a clevis constructed in accordance with an embodiment of my invention;

Figure 2 is a sectional view taken substantially on the line 2—2 of Figure 1;

Figure 3 is a sectional view taken substantially on the line 3—3 of Figure 1;

Figure 4 is a sectional view taken substantially on the line 4—4 of Figure 2.

My improved clevis as herein disclosed comprises two relatively heavy side shanks A and B. The outer face of the shank A is provided therealong with a relatively deep and wide groove or channel 2 and disposed through said shank A at the opposite ends of the groove or channel 2 are the openings 3, the outer end portions 4 of which are enlarged. Snugly disposed through the openings 3 and threading within the opposite end portions of the second shank B are the clevis pins 5, said shank B being provided with the suitably positioned threaded pockets 6 to receive said pins. These pockets 6 do not extend entirely through the shank B. The pins 5 are provided at their outer ends with the heads 7 which are received within the enlarged portions 4 of the openings 3 and carried by the outer face of each of said heads 7 is a reduced supplemental head 8 angular in cross section to permit a wrench or kindred tool to be engaged therewith in applying or removing the pin. The groove or channel 2 hereinbefore referred to in the shank A is of a depth to completely house the supplemental head 8 of each of the pins so that in use the heads of the pins will not become battered and worn down thus assuring the life of the clevis as a unit.

Snugly fitting between the supplemental heads 8 of the heads 7 is a lock plate 9. This plate 9 is housed within the groove or channel 2 and is in close contact with the bottom wall thereof. The plate 9 is held in applied position by a cap screw 10 extending through the plate 9 and threading into the shank A at the central portion of the bottom wall of the groove or channel 2. There is preferably interposed between the head 11 of the cap screw 10 and the lock plate 9 a conventional lock washer 12.

One of the pins 5 is snugly surrounded by a wear sleeve 14 which is free to rotate around such pin and adapted to have engaged therewith the conventional eye of a cable such as comprised in a conventional winch line while the second pin 5 is adapted to have engaged therewith in a well known manner a hook such as is used in logging.

For clarity in disclosure the pin 5 surrounded by the sleeve 14 may be termed a rear clevis pin and the second pin referred to as the front pin.

The opposed faces of the shanks A and B at the rear portions thereof and for a considerable distance therealong are reduced in thickness and have their inner marginal portions sloping inwardly so that there is an increased spacing between the rear portions of the shanks A and B in comparison with the spacing at the forward portion thereof. This spacing, in the lumber industry, is of particular importance and advantage as it prevents the cable eye from being thrust against the fairlead in passage thereover. While I do not wish to limit the use of my clevis to the logging industry, yet the efficiency of my clevis will, it is believed, be fully appreciated by the following:

In tractor logging, the tractor has a one drum winch on which winds the winch line and which line runs from the winch to a fairlead roller. The winch line is usually about sixty-five feet long which allows going out about forty feet from the tractor after logs. The logs are then winched in until the ends of the logs are clear of the ground. During the winching in the clevis with its associated loop and hook must pass over the fairlead and the strain is terrific as the loads of logs often weigh well over twenty tons. When the load is clear of the ground the tractor is started for the landing or the place where the logs are loaded for shipment. On the way to the landing, there is often encountered patches of soft ground to go through and several adverse grades to climb. In crossing through and over these parts the load has to be dropped, the tractor run ahead a distance substantially equal to the length of the winch line and the tractor brakes are then set and the drum is set in motion so that the load is winched up to the tractor. This winching in process is necessary many times and it will be readily understood that the terrific strain while passing over the fairlead is very severe on the clevis; on the outside of the cable eye; and the inside of the cable eye. By my improved clevis an effective winch assembly or coupling is provided for withstanding such strain.

From the foregoing description it is thought to be obvious that a clevis constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A clevis of the class described comprising two shanks, the outer face of one of the shanks having a groove or channel therealong, the opposite end portions of said one of the shanks having openings therethrough, headed pins insertible through the openings of said one of the shanks and threading into the second shank, the heads of the pins being housed within the groove, and means within the groove for coaction with the heads of the pins to lock the pins, said means and heads of the pins being so constructed and arranged against rotation with respect to the shanks.

2. A clevis of the class described comprising two shanks, the outer face of one of the shanks having a groove or channel therealong, the opposite end portions of said one of the shanks having openings therethrough, headed pins insertible through the openings of said one of the shanks and threading into the second shank, the heads of the pins being housed within the groove, means within the groove for coaction with the heads of the pins to lock the pins, said means and heads of the pins being so constructed and arranged against rotation with respect to the shanks, and a sleeve interposed between the shanks and rotatably surrounding one of the pins.

3. A clevis of the class described comprising two shanks, the outer face of one of the shanks having a groove or channel therealong, the opposite end portions of said one of the shanks having openings therethrough, headed pins insertible through the openings of said one of the shanks and threading into the second shank, the heads of the pins being housed within the groove, and means within the groove for coaction with the heads of the pins to lock the pins, said means and heads of the pins being so constructed and arranged against rotation with respect to the shanks, end portions of the shanks being decreased in thickness from their inner faces whereby a wider space is provided between said end portions of the shanks.

DAVID R. HAGER.